United States Patent
Furtak et al.

(10) Patent No.: US 7,182,982 B2
(45) Date of Patent: Feb. 27, 2007

(54) ALL-OPTICALLY PREPARED AND CONTROLLED NEMATIC LIQUID CRYSTAL LIGHT VALVE

(75) Inventors: Thomas E. Furtak, Golden, CO (US); Youngwoo Yi, Boulder, CO (US)

(73) Assignee: Colorado School of Mines, Golden, CO (US)

( * ) Notice: Subject to any disclaimer, the term of this patent is extended or adjusted under 35 U.S.C. 154(b) by 18 days.

(21) Appl. No.: 11/225,918

(22) Filed: Sep. 13, 2005

(65) Prior Publication Data

US 2006/0055837 A1    Mar. 16, 2006

Related U.S. Application Data

(60) Provisional application No. 60/609,694, filed on Sep. 13, 2004.

(51) Int. Cl.
*G02F 1/135* (2006.01)
(52) U.S. Cl. .................. 428/1.2; 428/1.1; 362/627; 349/135
(58) Field of Classification Search ............. 428/1.1, 428/1.2; 362/627; 349/123–124, 135
See application file for complete search history.

(56) References Cited

U.S. PATENT DOCUMENTS

| | | | |
|---|---|---|---|
| 3,499,702 A * | 3/1970 | Goldmacher et al. | 252/299.01 |
| 4,050,895 A * | 9/1977 | Hardy et al. | 436/527 |
| 4,127,322 A * | 11/1978 | Jacobson et al. | 353/31 |
| 4,723,839 A * | 2/1988 | Nakanowatari et al. | 349/128 |
| 4,929,057 A * | 5/1990 | Aoki et al. | 349/3 |
| 5,229,039 A * | 7/1993 | Ikeda et al. | 252/582 |
| 5,914,806 A * | 6/1999 | Gordon, II et al. | 359/296 |
| 5,936,691 A | 8/1999 | Kumar et al. | |
| 6,169,591 B1 * | 1/2001 | Kwon et al. | 349/124 |

OTHER PUBLICATIONS

Chigrinov, *Liquid Crystal Devices: Physics and Applications* (Artech House, Boston, 1999), pp. 52-65.
K. Ichimura, et al., Langmuir, 4, 1214-16 (1998).
W.M. Gibbons, et al., Nature (London) 351, 49-50 (1991).
M. Schadt, et al., Jpn. J. Appl. Phys. 31, 2155-64 (1992).
Z. Sekkat, et al. *Photoreactive Organic Thin Films* (Academic, San Diego, 2002), pp. 63-97.
K. Ichimura, et al., Liq. Cryst. 20(4), 423-35 (1996).
M. Schadt, et al., Nature (London) 381, 212-15 (1996).

(Continued)

*Primary Examiner*—Rena L. Dye
*Assistant Examiner*—Sow-Fun Hon
(74) *Attorney, Agent, or Firm*—Sheridan Ross P.C.

(57) ABSTRACT

The present invention provides a device that acts as an optical switch to control the intensity of a light beam through the action of a second control beam. This behavior is achieved through photoinduced anisotropy that develops in a monomolecular layer coating the inside surfaces of a liquid crystal cell. One of the surfaces is permanently aligned prior to assembly by illuminating the surface with polarized light in the presence of oxygen. The other surface retains reversible behavior, adapting anisotropy according to the orientation of the polarization of the control beam. Accordingly, an optically controlled liquid crystal light valve is provided that does not require contact-rubbing methods in order to permanently align one of the layers coating an inside surface of the cell.

17 Claims, 3 Drawing Sheets

OTHER PUBLICATIONS

P. Palffy-Muhoray, et al., Appl. Phys. A: Mat. Sci. Proc. 75, 293-300 (2002).
A. Galvan-Gonzalez, et al., Optics Let. 24 (23), 1741-43 (1999).
J. Ma, et al., Appl. Opt. 34(24), 5352-60 (1995).
A. Galvan-Gonzalez, et al., J. Opt. Soc. Am. B 17(12), 1992-2000 (2000).
Y. W. Yi, et al., J. Vac. Sci. Tech. A 21(5), 1770-75 (2003).
Ichimura, Chem. Rev. (2000), 100, 1847-73.
PCT International Search Report, dated Oct. 20, 2006, 4 pages.
PCT Written Opinion, dated Oct. 20, 2006, 3 pages.

* cited by examiner

ALL-OPTICALLY PREPARED AND CONTROLLED NEMATIC LIQUID CRYSTAL LIGHT VALVE

This application claims priority from U.S. Provisional Patent Application No. 60/609,694 filed Sep. 13, 2004, the disclosure of which is hereby incorporated herein by reference.

The U.S. Government has a paid-up license in this invention and the right in limited circumstances to require the patent owner to license others on reasonable terms as provided for by the terms of DMR-0213918 awarded by the National Science Foundation.

FIELD OF THE INVENTION

The present invention relates generally to liquid crystal light valve devices, and specifically to the control surfaces used to regulate the liquid crystal medium in such a device, under conditions that demonstrate both permanent and actively controlled surface anisotropy, and methods for producing these devices.

BACKGROUND OF THE INVENTION

In liquid crystal display (LCD) devices, the interior of the windows are coated with mechanically rubbed polymer layers to align the liquid crystal (LC) medium into a single domain. (Chigrinov, *Liquid Crystal Devices: Physics and Applications* (Artech House, Boston, 1999).) This practice has several disadvantages: The rubbing cloth is a source of contamination and electrostatic charging. The rubbed polymer is very difficult to pattern. And, it is impossible to control the alignment after cell assembly. To overcome these limitations, Ichimura and Gibbons initiated studies of organic thin films containing photosensitive groups for non-contact alignment. (Ichimura et al., *Langmuir* 4:1214 (1988); Gibbons et al., *Nature* 351:49 (1991).) Numerous variations have been reported, as has been documented in a recent review. (Ichimura, *Chem. Rev.* 100:1847 (2000).) Among the most successful designs are those that exploit the trans-cis-trans photoisomerization cycle of azobenzene. The absorption cross section for this process depends on the direction of the optical electric field. Therefore, an ensemble of azobenzene groups will develop photoinduced anisotropy (PIA) under polarized illumination as the molecules are agitated into low absorption orientations. (Sekkat and Knoll, *Photoreactive Organic Thin Films* (Academic Press, San Diego, 2002).) The azobenzene structure is similar to the rigid unit of common LC molecules, which promotes effective communication of the anisotropy to an adjacent LC medium. Therefore, the orientation of the LC next to this surface can be externally controlled. In a useful device, the opposite surface must maintain fixed alignment through strong anchoring. Typical embodiments are hybrids that involve the light-controlled layer on one window and a conventionally rubbed polymer on the opposite window. (Ichimura et al., *Langmuir* 4:1214 (1988); Gibbons et al., *Nature* 351:49 (1991); Ichimura et al., *Liquid Crystals* 20:423 (1996); Schadt et al., *Nature* 381:212 (1996); Palffy-Muhoray et al., *Appl. Phys. A,* 75:293 (2002).) While this configuration enables photoinduced switching after assembly of the cell, the rubbed polymer compromises the advantages of non-contact alignment.

Accordingly, photoinduced anisotropy has been used in hybrid liquid crystal light valves in the past. However, these hybrid cells contain one surface that is aligned by contact rubbing methods, which introduce contamination, scratches, and electrostatic charging, all of which limit the quality that can be achieved in a device.

SUMMARY OF THE INVENTION

In the realization of an all-optically aligned and controlled LC cell, one of the surfaces must exhibit irreversible photoalignment. In one embodiment this can be accomplished through light-induced cross-linking or other photochemical processes. (Chigrinov et al., in *Optical Application of Liquid Crystals*, L. Vicari, ed. (Institute of Physics Publishing, Bristol, UK, 2003) Ch. 5.) However, the simplest approach is to exploit photochemical modification of the same molecules that are used for the light-controlled layer. Materials containing azobenzene groups commonly exhibit photochemical modification under the right conditions. (Galvan-Gonzales et al., *Opt. Lett.* 24:1741 (1999); Ma et al., *Appl. Opt.* 34:5352 (1995); Galvan-Gonzales et al., *J. Opt. Soc. Am.* B 17:1992 (2000).) Embodiments of the present invention exploit this characteristic to achieve fixed, as well as reversible, behavior using different treatments of the same type of alignment surface, made from a silane-coupled monolayer of derivatized methyl red (d-MR SAM).

Optical memory, high resolution micro displays, and optical switching of optical beams may be provided by embodiments of the present invention. In the past, the production of high quality displays has been limited by the "contact" alignment methods that have been used to produce such devices. The permanent photoinduced anisotropy portion of the present invention allows display manufacturing without contact with the window surfaces. In addition, advanced all-optical computers that rely on light-driven switching can use cells constructed in accordance with embodiments of the present invention. Devices that demonstrate optical bistability, which is a fundamental element in an all-optical computer using embodiments of the present invention, can also be constructed using embodiments of the present invention.

In particular, an optically prepared and controlled nematic liquid crystal device, using derivatized methyl red self-assembled monolayers for surface alignment on both of its windows is described. This material demonstrates both reversible and irreversible photoinduced anisotropy, depending on the availability of oxygen during illumination. One window of the cell is permanently aligned prior to assembly while the other window retains its sensitivity to the orientation of the polarization of a controlling optical beam, leading to either a uniform or twisted state in the nematic cell. The entire construction and management of the cell is thereby achieved without touching the alignment surfaces.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

BRIEF DESCRIPTION OF THE DRAWINGS

FIG. 1(*b*) illustrates the absorption spectrum of a d-MR SAM before and after treatment illumination in the presence of oxygen.

DETAILED DESCRIPTION

The synthesis of the d-MR ethoxy silane molecule, which has the technical name 2-(4-Dimethylamino-phenylazo)-N-(3-triethoxysilane-propyl)-benzamide, and preparation of d-MR SAMs (self-assembled monolayers) have been explained in a previous publication. (Yi et al., *J. Vac. Sci. Technol.* A 21:1770 (2003).) The synthesis is generally performed by employing 1,3-dicyclohexylcarbodiimide (DCC) in a dehydration reaction to form what is known in the art as a "peptide bond". The resulting molecule is dissolved in toluene with a small amount of a catalyst, for instance, n-butylamine. The catalyst helps to promote the attachment of the dMR to a substrate. In one embodiment, the substrate is glass or silicon that has been previously saturated with OH (silanol-coated). Alternatively, any substrate that is initially covered with a Si—OH species will work. For example, a spin-on glass could be used that is then coated on another material (i.e., metal, glass, silicon, etc.), so that the silane chemistry forms a covalent bond. In addition the surface of a polymer could be used with this type of silane coupling.

Figures 1A, 1B:
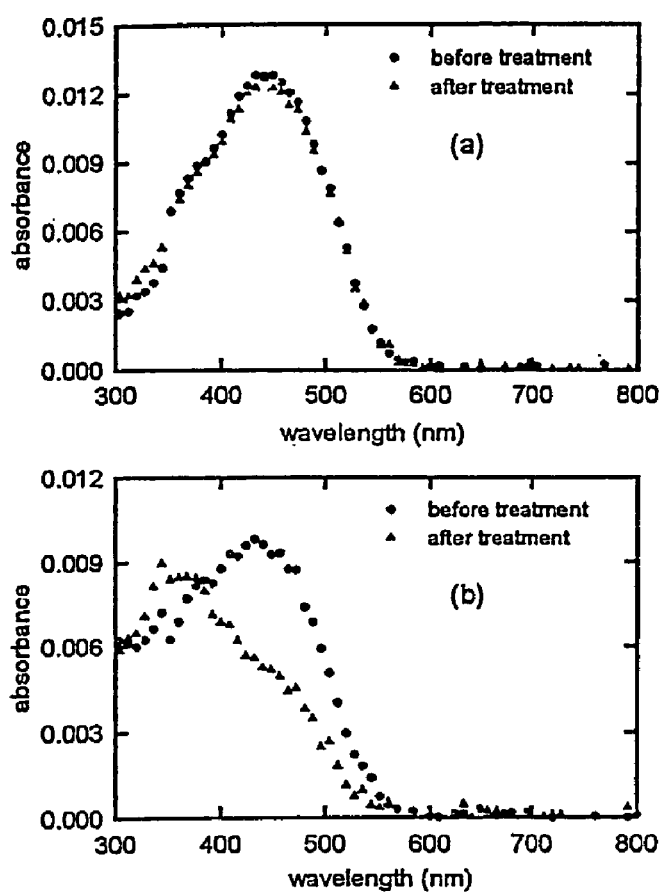
FIG. 1(*a*) illustrate the absorption spectrum of a d-MR SAM before and after treatment illumination in the absence of oxygen.

FIG. 1(a) shows the absorption spectrum of a d-MR SAM before and after extensive treatment illumination at normal incidence with polarized light at 436-nm in the absence of oxygen. More particularly, the illumination treatment comprised a total illumination dose of 10 $J/cm^2$ and was performed in a nitrogen environment. The SAMs were deposited on both sides of the glass slides. There is no significant evolution of the layer due to this exposure. Changes in the orientation of the polarization are associated with rapid and reversible changes in the direction of anisotropy of the layer.

By contrast, when the illumination treatment is repeated in the presence of oxygen, a progressive and irreversible modification of the layer is observed (FIG. 1(b)). These modifications are accompanied by a loss of PIA sensitivity. Instead, the photochemical process leads to permanent anisotropy. The treatment of the d-MR SAM to achieve the absorption spectrum shown in FIG. 1(b) comprised a total illumination dose of 12 $J/cm^2$ and was performed in air. The SAMs were deposited on both sides of the glass slides.

In one embodiment, an LC cell can be made with a first d-MR SAM layer on a first glass slide and a second d-MR SAM layer on a second glass slide, 20 µm spacers, and filled (above the isotropic transition temperature) with a nematic liquid crystal, 4-n-pentyl-4'-cyanobiphenyl (5CB) using capillary action, and then sealed on its edges with epoxy. Prior to assembly one of the d-MR SAMs can be exposed to polarized light from a mercury lamp (with an output wavelength restricted to a band between 325 nm and 475 nm) to induce a substantially irreversible alignment. In a preferred embodiment, the illumination dose is about 40 $J/cm^2$. Meanwhile, the other d-MR SAM is maintained in a photosensitive state through handling under subdued light.

As can be appreciated, the use of any liquid crystal is possible. Other liquid crystal materials that respond to the alignment layers can be used. The term "nematic" refers to the particular ordered phase in which the molecules adopt an orientation that, on average, points along the same line is space. This line, known as the "director", defines the local orientation of the material. It is the role of the alignment layers to organize what would otherwise be randomly distributed three-dimensional domains into a single domain.

When the cell construction is completed according to embodiments of the present invention the cell is placed between crossed polarizers and probed with low intensity monochromatic light having a wavelength of 650 nm. A polarized control beam at 436 nm, incident on the sensitive window, may be used to manipulate the LC alignment in the cell. By changing the orientation of the polarization of the control beam, the alignment direction of the sensitive d-MR SAM can be changed, while the alignment direction of the photochemically altered SAM remained fixed.

Figure 2:
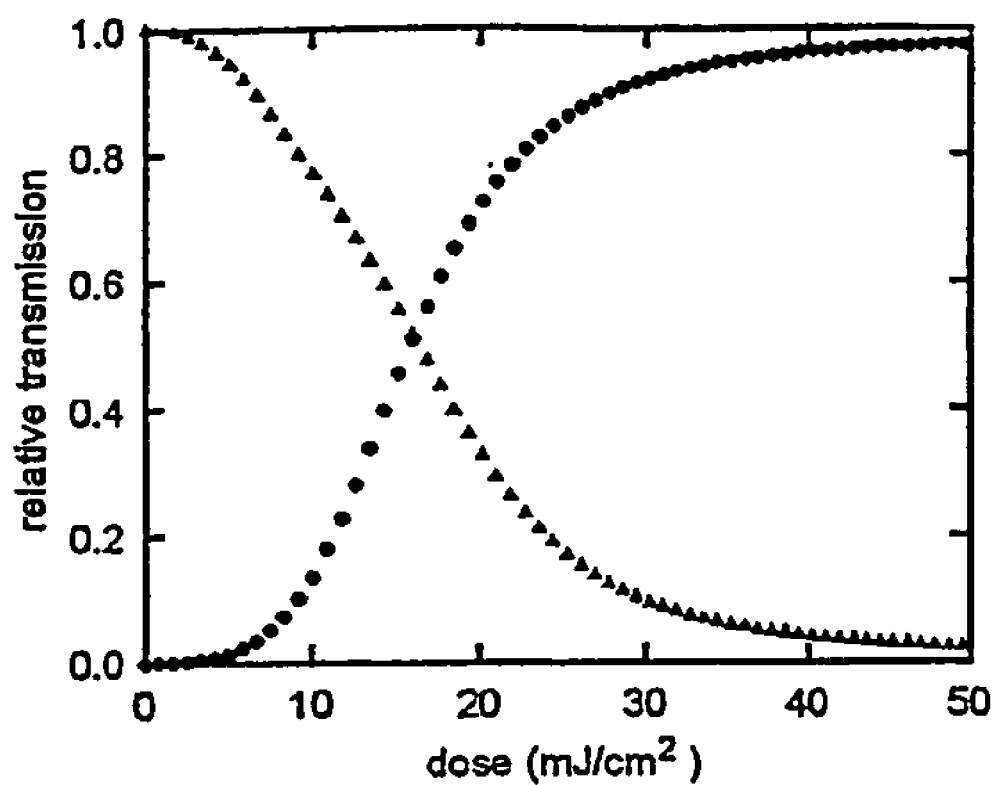
FIG. 2 illustrates the results of the photo-regulation of a cell in accordance with embodiments of the present invention as measured by the intensity of the transmitted probe beam.

FIG. 2 illustrates optically controlled switching of the transmission of the nematic LC cell between crossed polarizers. More particularly, FIG. 2 shows the results of the photo-regulation of the cell, as measured by the intensity of the transmitted probe beam. The circles (triangles) represent switching from the uniform (twisted) state to the twisted (uniform) state. The intensity of the polarized control beam was 0.6 $mW/cm^2$. The alignment layer on one window was a photo-sensitive d-MR SAM while that on the opposite window was a photo-oxidized d-MR SAM. Switching was observed from a uniform to a 90-degree twisted state (circles) as well as in reverse (triangles). Therefore, the operation of this device, as well as the preparation of the surface anchoring conditions during assembly, has been achieved through entirely non-contact methods. Some photochemical processes involve crosslinking, where bonds are formed between a thick layer and a substrate. Embodiments of the present invention create a covalently bonded monolayer, rather than using a thick layer. The top surface in a monolayer is in continuous and efficient communication with the liquid crystal. The monolayer communicates more efficiently with the liquid crystal than the traditional thick layers of molecules do. Also, the monolayer is aligned on a substrate without contact as discussed above.

In accordance with embodiments of the present invention, the mechanism of the irreversible alignment involves photo-oxidation. As demonstrated in FIGS. 1(a) and 1(b), the availability of oxygen is an essential component of the transformation. The SAM in a sealed LC cell is protected from this degradation mechanism. Hybrid LC cells made with our d-MR SAMs photo-switched without any degradation for more than 100 cycles involving a total dose comparable to the dose under which unprotected (air exposed) d-MR SAMs demonstrated the irreversible change. Photoisomerization-induced reorientation still operates under oxidizing conditions, but the product species is far less sensitive to continued illumination. This leads to irreversible anisotropy in the orientation distribution. The favored direction is perpendicular to the polarization of the treatment beam. This explains why the anchoring direction of the photo-oxidized layer is not altered by the photoinduced switching cycle of the assembled device.

Figure 3:
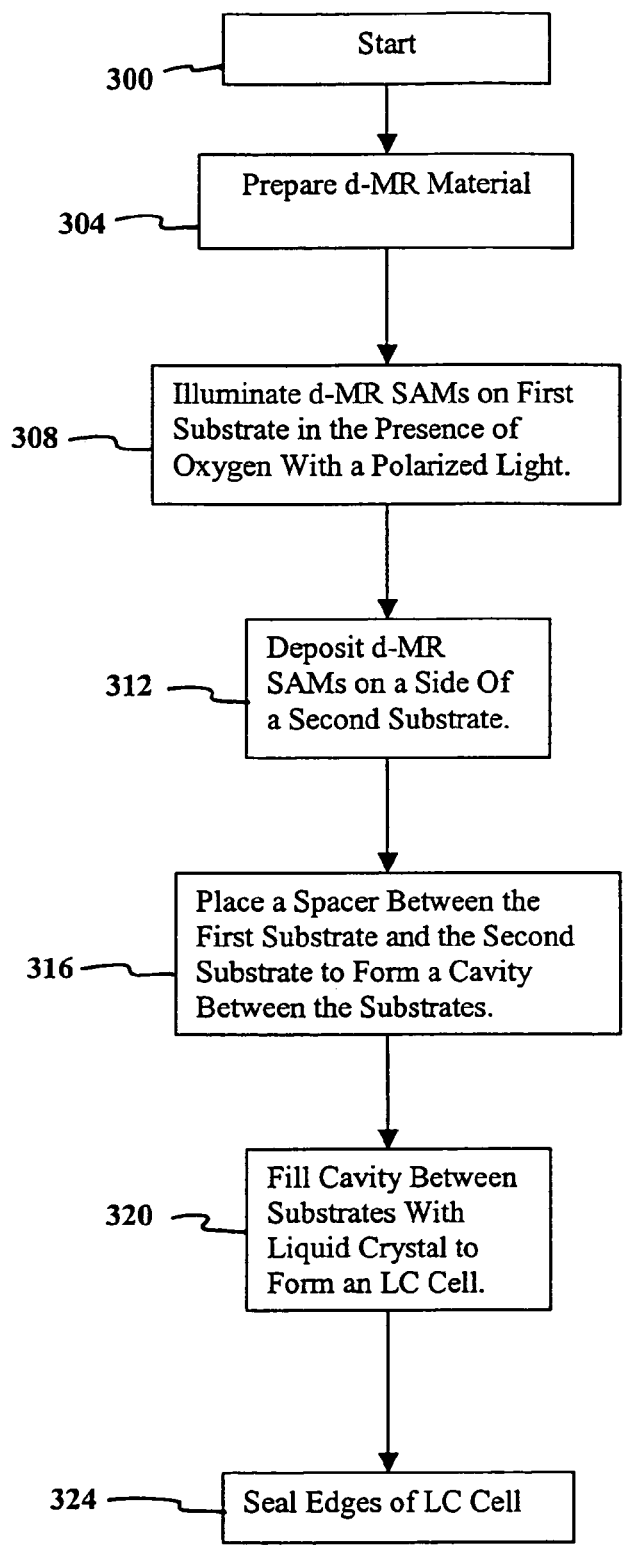
FIG. 3 is a flow diagram depicting the process of creating an LC cell in accordance with embodiments of the present invention.

With reference to FIG. 3 a process of producing a LC cell in accordance with one embodiment of the present invention will be described.

Initially, the d-MR SAM material is produced and deposited on a substrate as described above and in the disclosed references in step 304. An amount of d-MR SAMs are attached to a first substrate in step 304 creating a first layer. The deposition of the d-MR SAMs involves covalent bonding to a hydroxylated surface and therefore the reaction is self-limiting. Specifically, a layer that is more than one molecule thick cannot be produced. The goal is to prevent the formation of silanol globs in the solution before the reactants reach the surface. If these globs occur, they might deposit to produce a non-ideal (and very rough) layer that is considerably thicker than the monolayer.

Thereafter the first layer of d-MR SAMs is illuminated with polarized light in the presence of oxygen in step 308. The polarized light can be directed toward the first layer at any angle. For example, the polarized light may have an angle of incidence that is normal to the first layer. This angle of incidence may be achieved by having a light source placed proximally near the first layer with a linear polarizer inserted there between as in U.S. Pat. No. 5,936,691 to Kumar et al., which is incorporated herein by reference. Even though a normal angle of incidence is preferred, other orientations and angles of incidence may be used in step 308. In step 308, the first d-MR SAM layer is formed (attached) to the first substrate and after this step the crystals in the first d-MR SAM layer are irreversibly aligned through a chemical bond that is induced by contactless methods.

The next step is to prepare the second layer of d-MR SAMs. In step 312, a second amount of d-MR SAMs are attached to a second substrate. This layer of d-MR SAMs is not photochemically altered like the first layer was. Rather, they are maintained in a photosensitive state and the crystals on the second d-MR SAM layer remain sensitive to the changing polarization of a control beam. Next, the two substrates are brought together with a spacer(s) placed between them in step 316. The spacer(s) create a cavity between the first substrate and the second substrate that is filled with a liquid crystal in step 320. To complete the LC cell, the edges are sealed by epoxy or other known methods.

In accordance with embodiments of the present invention, permanent photoinduced anisotropy is achieved on the irreversible surface, without requiring manufacturing processes that involve contact with the window surfaces, such as mechanical buffering. Instead, permanent alignment is achieved by providing treatment illumination in the presence of oxygen. The reversible surface is maintained in subdued light conditions until it has been incorporated into a sealed cell. The light transmission characteristics of the cell can thereafter be controlled using a probe beam. Accordingly, the present invention includes a process for producing a liquid crystal light valve.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for manufacturing optically controlled liquid crystal light valves, comprising the following steps:
    (a) providing a first silane-coupled monolayer of derivatized methyl red (d-MR SAM layer) and a first substrate;
    (b) exposing said first d-MR SAM layer to polarized light having a first orientation of polarization;
    (c) exposing said first d-MR SAM layer to oxygen, wherein said exposing to polarized light and said exposing to oxygen are performed concurrently, and wherein molecules in said first d-MR SAM layer are irreversibly aligned relative to said first substrate;
    (d) providing a second d-MR SAM layer and a second substrate;
    (e) inserting a spacer between said first and second substrates to form a cell volume; and
    (f) filling said cell volume with a liquid crystal to form a light valve assembly, wherein said second d-MR SAM layer is not exposed to polarized light and oxygen at the same time prior to the forming of said light valve assembly.

2. The method of claim 1, wherein said first substrate and said second substrate are formed from different materials.

3. The method of claim 1, wherein said exposing said first d-MR SAM layer to polarized light comprises exposing said first d-MR SAM layer to light having a wavelength of from about 325 nm to about 475 nm.

4. The method of claim 1, wherein said exposing said first d-MR SAM layer to polarized light comprises exposing said first d-MR SAM layer to light having an illumination dose of about 40 J/cm$^2$.

5. The method of claim 1, wherein said liquid crystal is a nematic type liquid crystal.

6. The method of claim 5, wherein said nematic type liquid crystal is 4-n-pentyl-4'-cyanobiphenyl.

7. The method of claim 1, wherein said exposing said first d-MR SAM layer to polarized light comprises exposing said first d-MR SAM layer to light at a substantially normal angle of incidence.

8. The method of claim 1, wherein filling said cell volume with a liquid crystal to form a light valve assembly is done by capillary action.

9. An optically controlled liquid crystal light valve, comprising: a first layer of silane-coupled monolayer of derivatized methyl red (d-MR SAM layer); a second d-MR SAM layer; a liquid crystal, wherein said liquid crystal is substantially between said first d-MR SAM layer and said second d-MR SAM layer; wherein crystals in said first d-MR SAM layer are irreversibly and photochemically aligned in a first direction; and wherein crystals in said second d-MR SAM layer are reversibly and selectively aligned by polarized light.

10. The valve of claim 9 further comprising:
   a first substrate, wherein said first d-MR SAM layer is formed on said first substrate;
   a second substrate, wherein said second d-MR SAM layer is formed on said second substrate; and
   a spacer, wherein said spacer substantially separates said first substrate and said second substrate.

11. The valve of claim 10, wherein said spacer is about 20 µm.

12. The valve of claim 10, wherein said first substrate and said second substrate are formed from different materials.

13. The valve of claim 9, wherein said liquid crystal is a nematic liquid crystal.

14. The valve of claim 13, wherein said nematic liquid crystal is 4-n-pentyl-4'-cyanobiphenyl.

15. An optically controlled liquid crystal light valve prepared by the process comprising the following steps:
   (a) providing a first silane-coupled monolayer of derivatized methyl red (d-MR SAM layer) and a first substrate;
   (b) exposing said first d-MR SAM layer to polarized light having a first orientation of polarization;
   (c) exposing said first d-MR SAM layer to oxygen, wherein said exposing to polarized light and said exposing to oxygen are performed concurrently, and wherein crystals in said first d-MR SAM layer are irreversibly aligned in a first direction;
   (d) providing a second d-MR SAM layer and a second substrate;
   (e) inserting a spacer between said first and second substrates to form a cell volume; and
   (f) filling said cell volume with a liquid crystal to form a light valve assembly;
wherein said second d-MR SAM layer is not exposed to polarized light and oxygen at the same time prior to the forming of said light valve assembly.

16. The valve of claim 15, wherein said liquid crystal is a nematic liquid crystal.

17. The valve of claim 16, wherein said nematic type liquid crystal is 4-n-pentyl-4'-cyanobiphenyl.

* * * * *